United States Patent
Nozaki et al.

(10) Patent No.: US 7,320,657 B2
(45) Date of Patent: Jan. 22, 2008

(54) VEHICLE AUTOMATIC TRANSMISSION CONTROL APPARATUS WITH FAIL-SAFE ARRANGEMENT

(75) Inventors: Kazutoshi Nozaki, Nisshin (JP); Masami Kondo, Toyota (JP); Kazuyuki Noda, Handa (JP); Takuya Fujimine, Hamamatsu (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 238 days.

(21) Appl. No.: 11/196,417

(22) Filed: Aug. 4, 2005

(65) Prior Publication Data
US 2006/0030446 A1    Feb. 9, 2006

(30) Foreign Application Priority Data
Aug. 5, 2004    (JP)    ............................ 2004-229916

(51) Int. Cl.
*F16H 31/00*    (2006.01)
(52) U.S. Cl. ........................................... 475/119

(58) Field of Classification Search ................ 475/119, 475/123, 133; 477/906
See application file for complete search history.

(56) References Cited

U.S. PATENT DOCUMENTS 6,966,862 B2 *    11/2005    Inuta ........................... 475/119

FOREIGN PATENT DOCUMENTS

| JP | 9-303545 | 11/1997 |
| JP | 2000-65203 | 3/2000 |

* cited by examiner

*Primary Examiner*—Dirk Wright
(74) *Attorney, Agent, or Firm*—Oblon, Spivak, McClelland, Maier & Neustadt, P.C.

(57) ABSTRACT

A control apparatus for controlling a vehicle automatic transmission including (i) a first coupling device to be engaged for establishing an emergency gear position and (ii) a second coupling device to be released for establishing the emergency gear position. The control apparatus includes: (a) first and second controller valves for controlling the respective first and second coupling devices; and (b) a fail-safe valve having (b-1) a first output port connected to a drain port of the first controller valve, (b-2) a first input port to which a working fluid is input, (b-3) a first drain port for draining the working fluid, (b-4) a second output port connected to an input port of the second controller valve, (b-5) a second input port to which the working fluid is input, and (b-6) a second drain port for draining the working fluid.

10 Claims, 7 Drawing Sheets

|  | C1 | C2 | C3 | C4 | B1 | B2 | F1 |
|---|---|---|---|---|---|---|---|
| P |  |  |  |  |  |  |  |
| Rev1 |  |  | O |  |  | O |  |
| Rev2 |  |  |  | O |  | O |  |
| N |  |  |  |  |  |  |  |
| 1st | O |  |  |  |  | (O) | O |
| 2nd | O |  |  |  | O |  |  |
| 3rd | O |  | O |  |  |  |  |
| 4th | O |  |  | O |  |  |  |
| 5th | O | O |  |  |  |  |  |
| 6th |  | O |  | O |  |  |  |
| 7th |  | O | O |  |  |  |  |
| 8th |  | O |  |  | O |  |  |

|  | C1 | C2 | C3 | C4 | B1 | B2 | F1 |
|---|---|---|---|---|---|---|---|
| P |  |  |  |  |  |  |  |
| Rev1 |  |  | ○ |  |  | ○ |  |
| Rev2 |  |  |  | ○ |  | ○ |  |
| N |  |  |  |  |  |  |  |
| 1st | ○ |  |  |  |  | (○) | ○ |
| 2nd | ○ |  |  |  | ○ |  |  |
| 3rd | ○ |  | ○ |  |  |  |  |
| 4th | ○ |  |  | ○ |  |  |  |
| 5th | ○ | ○ |  |  |  |  |  |
| 6th |  | ○ |  | ○ |  |  |  |
| 7th |  | ○ | ○ |  |  |  |  |
| 8th |  | ○ |  |  | ○ |  |  |

| SHIFT RANGE | GEAR POSITIONS AVAILABLE |
|---|---|
| D | 1,2,3,4,5,6,7,8 |
| 7 | 1,2,3,4,5,6,7 |
| 6 | 1,2,3,4,5,6 |
| 5 | 1,2,3,4,5 |
| 4 | 1,2,3,4 |
| 3 | 1,2,3 |
| 2 | 1,2 |
| L | 1 |

SHIFT-UP ↑

↓ SHIFT-DOWN

VEHICLE AUTOMATIC TRANSMISSION CONTROL APPARATUS WITH FAIL-SAFE ARRANGEMENT

This application is based on Japanese Patent Application No. 2004-229916 filed on Aug. 5, 2004, the content of which is incorporated hereinto by reference.

BACKGROUND OF THE INVENTION

1. Field of the Invention

The present invention relates in general to a control apparatus for controlling an automatic transmission of a vehicle, and more particularly to techniques associated with a fail-safe arrangement enabling the vehicle to run in the event of operational abnormality in controller valves which are operable to selectively establish a plurality of gear positions.

2. Discussion of Related Art

In a vehicle automatic transmission in which a plurality of hydraulically operated frictional coupling devices are selectively engaged and released to selectively establish a plurality of gear positions having respective different speed ratios, there is provided a control apparatus for controlling a hydraulic pressure of each of the hydraulically operated frictional coupling devices. As such a control apparatus, there is known an apparatus which includes a plurality of solenoid valves serving as coupling-device controller valves operable to control flow of a pressurized working fluid that is to be supplied to the respective hydraulically operated frictional coupling devices, so as to selectively engage and release the frictional coupling devices. JP-H-09-303545A discloses a fail-safe arrangement which is to be employed in the control apparatus. In the disclosed arrangement, a fail-safe valve is provided between the coupling-device controller valves and the frictional coupling devices. When the controller valves are brought into a pressure-output failure state, due to electrical connector disconnection, wire breakage or other factors, in which the valve becomes incapable of applying hydraulic pressure to the frictional coupling devices, the fail-safe valve is controlled to establish an emergency fluid passage allowing the application of hydraulic pressure therethrough to the frictional coupling devices for establishing a predetermined one of the plurality of gear positions as an emergency gear position, so as to enable the vehicle to keep running.

However, in the conventional control apparatus with the above-described fail-safe arrangement in which the fail-safe valve is provided between the coupling-device controller valves and the frictional coupling devices, even where the controller valves do not suffer from the pressure output failure, the hydraulic pressure is applied to the frictional coupling devices via the fail-safe valve. That is, this arrangement always requires a long fluid channel, irrespective of whether the pressure output failure of the controller valves is present or not, making it difficult to enable the coupling devices to be accurately controlled in quick response to the coupling-device controller valves.

SUMMARY OF THE INVENTION

The present invention was made in the light of the background art discussed above. It is therefore an object of the invention to provide a fail-safe arrangement for enabling a vehicle to run with a predetermined gear position being established, in the event of the above-described pressure output failure of the coupling-device controller valves, by assuring supply of hydraulic pressure to the hydraulically operated frictional coupling device or devices which are to be engaged for establishing the predetermined gear position, without deteriorating accuracy and speed of response of the frictional coupling devices to the coupling-device controller valves. This object may be achieved according to any one of first through tenth aspects of the invention which are described below.

The first aspect of this invention provides a control apparatus for controlling a vehicle automatic transmission including a plurality of hydraulically operated frictional coupling devices operable to selectively establish a plurality of gear positions having respective different speed ratios, wherein the plurality of hydraulically operated frictional coupling devices include (i) at least one first coupling device that is to be engaged for establishing one of at least one emergency gear position which is a predetermined one of the plurality of gear positions, and (ii) at least one second coupling device that is to be released for establishing the emergency gear position. The control apparatus includes: (a) a plurality of coupling-device controller valves operable to control flow of a pressurized working fluid that is to be supplied to the respective hydraulically operated frictional coupling devices; and (b) a fail-safe valve. Each of the plurality of coupling-device controller valves has: (a-1) an input port to which the pressurized working fluid is to be input; (a-2) an output port from which the working fluid is to be output to a corresponding one of the hydraulically operated frictional coupling devices; (a-3) a drain port from which the working fluid is to be drained; and (a-4) a spool which is movable to change a combination of communicated ones of the input, output and drain ports which are held in communication with each other, such that the corresponding one of the hydraulically operated frictional coupling devices is selectively engaged and released depending upon the combination of the communicated ports. The fail-safe valve has: (b-1) a first output port connected to the drain port of a first controller valve which is one of the controller valves controlling flow of the working fluid supplied to each of the at least one first coupling device; (b-2) a first input port communicable with the first output port such that the working fluid supplied to the first input port can be supplied to the drain port of the first controller valve through the first output port; (b-3) a first drain port communicable with the first output port such that the working fluid discharged to the first output port from the each of the at least one first coupling device can be drained through the first drain port; (b-4) a second output port connected to the input port of a second controller valve which is one of the controller valves controlling flow of the working fluid supplied to each of the at least one second coupling device; (b-5) a second input port communicable with the second output port such that the pressurized working fluid supplied to the second input port can be supplied to the input port of the second controller valve through the second output port; and (b-6) a second drain port communicable with the second output port such that the working fluid discharged to the second output port from the each of the at least one second coupling device can be drained through the second drain port.

According to the second aspect of the invention, in the control apparatus defined in the first aspect of the invention, the fail-safe valve is switchable between a normal communication state and an emergency communication state, wherein when the fail-safe valve is placed in the normal communication state, the first output port and the first drain port are held in communication with each other, the first input port is not held in communication with the first output port, the second output port and the second input port are held in communication with each other, and the second drain port is not held in communication with the second output port, and wherein when the fail-safe valve is placed in the emergency communication state, the first output port and the first input port are held in communication with each other, the first drain port is not held in communication with the first output port, the second output port and the second drain port are held in communication with each other, and the second input port is not held in communication with the second output port.

According to the third aspect of the invention, in the control apparatus defined in the first or second aspect of the invention, each of the plurality of coupling-device controller valves is provided by an electro-magnetically operated valve. The control apparatus further includes: a power supply failure detector detecting a power supply failure disabling sufficient supply of an electric power to the plurality of coupling-device controller valves; and a fail-safe-valve switcher operable when the power supply failure is detected by the power supply failure detector, to place the fail-safe valve in an emergency communication state establishing the emergency gear position.

According to the fourth aspect of the invention, in the control apparatus defined in the third aspect of the invention, each of the plurality of controller valves, when being energized, is placed in an open state in which the output port and the input port are held in communication with each other while the drain port is not held in communication with the output port, wherein each of the plurality of controller valves, when being de-energized, is placed in a closed state in which the output port are the drain port are held in communication with each other while the input port is not held in communication with the output port.

According to the fifth aspect of the invention, in the control apparatus defined in the fourth aspect of the invention, when the fail-safe valve is placed in the emergency communication state, the first output port and the first input port are held in communication with each other, so as to serve as an emergency output port and an emergency input port, for allowing supply of the working fluid to each of the at least one first coupling device through the emergency input and output ports of the fail-safe valve and the drain and output ports of the first controller valve, so that the at least one first coupling device is engaged for establishing the emergency gear position.

According to the sixth aspect of the invention, in the control apparatus defined in the fifth aspect of the invention, when the fail-safe valve is placed in the emergency communication state, the second drain port is held in communication with the second output port, so as to serve as an emergency drain port, for allowing draining of the working fluid discharged from each of the at least one second coupling device through the output and input ports of the second controller valve and the second output and emergency drain ports of the fail-safe valve, so that the at least one second coupling device is released for establishing the emergency gear position.

According to the seventh aspect of the invention, in the control apparatus defined in any one of the third through sixth aspects of the invention, the fail-safe-valve switcher is provided by a spool-position controller valve selectively allowing and inhibiting application of hydraulic pressure to a spool of the fail-safe valve in a direction causing the fail-safe valve to be placed in the emergency communication state, wherein the spool-position controller valve is provided by an electro-magnetically operated valve, wherein the spool-position controller valve, when being energized, is placed in a closed state inhibiting the application of the hydraulic pressure, so that the fail-safe valve is not placed in the emergency communication state, and wherein the spool-position controller valve, when being de-energized, is placed in an open state allowing the application of the hydraulic pressure, so that the fail-safe valve is placed in the emergency communication state.

According to the eighth aspect of the invention, in the control apparatus defined in the seventh aspect of the invention, the spool-position controller valve serves as the power supply failure detector, and detects the power supply failure when the spool-position controller valve is not energized, wherein the spool-position controller valve serving as the power supply failure detector, upon detection of the power supply failure, outputs the hydraulic pressure, as a signal representative of the power supply failure, which is applied to the spool of the fail-safe valve.

According to the ninth aspect of the invention, in the control apparatus defined in the seventh or eighth aspect of the invention, the fail-safe valve includes a biaser biasing the spool of the fail-sage valve in a direction opposite to the direction causing the fail-safe valve to be placed in the emergency communication state.

According to the tenth aspect of the invention, in the control apparatus defined in any one of the first through ninth aspects of the invention, the fail-safe valve includes a spool which is movable to change a combination of communicated ones of the first output, input and drain ports which are held in communication with each other and also a combination of communicated ones of the second output, input and drain ports which are held in communication with each other, wherein the spool of the fail-safe valve is provided by a single member.

In the control apparatus of each of the first through tenth aspects of the invention, in which the fail-safe valve is connected to the drain port or input port of each of the coupling-device controller valves, there is less risk of deteriorating accuracy and speed of response of the frictional coupling devices to the coupling-device controller valves, than in an arrangement in which the fail-safe valve is connected to the output port of each of the coupling-device controller valves.

In the control apparatus of the second aspect of the invention, when the fail-safe valve is switched to the emergency communication state from the normal communication state, for example, in response to detection of a power supply failure, the first input port is brought into communication with the first output port which is connected to the drain port of the first controller valve arranged to control flow of the working fluid supplied to each of the at least one first coupling device, while the second drain port is brought into communication with the second output port which is connected to the input port of the second controller valve arranged to control flow of the working fluid supplied to each of the at least one second coupling device. With the fail-safe valve being placed in the emergency communication state, the working fluid can be supplied to the first coupling device through the first input and output ports of the fail-safe valve and the drain and output ports of the first controller valve, while at the same time the working fluid can be discharged from the second coupling device through the output and input ports of the second controller valve and the second output and drain ports of the fail-safe valve. In this instance, since the working fluid is discharged from the second coupling device through the output and input ports of the second controller valve, the discharge of the working fluid from the second coupling device can be made even where the input and output ports problematically remain communicated with each other, for example, due to so-called "valve stuck" which is caused by debris or other foreign matters caught in the valve structure and impeding movement of a spool of the valve. Therefore, when the fail-safe valve is placed in the emergency communication state, the second coupling device is reliably released while the first coupling device is engaged, thereby avoiding so-called "interlocking" due to simultaneous engagements of the first and second coupling devices.

Further, in the control apparatus of the second aspect of the invention, when the fail-safe valve is placed in the normal communication state, the second input port is held in communication with the second output port which is connected to the input port of the second controller valve, for allowing supply of the working fluid to the input port of the second controller valve, whereby the second coupling device can be controlled to be selectively engaged and released.

There is known an arrangement enabling a vehicle to run even in the event of the "interlocking", as disclosed in JP-2000-65203, for example. In this arrangement, the interlocking is detected by means of sensors arranged to detect hydraulic pressure in each of the hydraulically operated frictional coupling devices, so that the transmission, when the interlocking is detected, is placed in one of limited gear positions which can be established by the simultaneous engagements of coupling devices in question, namely, which permit the vehicle to run without suffering from the interlocking. In this arrangement, however, if the above-described pressure output failure is caused by, for example, electrical connector disconnection, in addition to the interlocking, the vehicle can not be avoided from suffering from the interlocking problem, unless at least one of the above-described limited gear positions coincides with a predetermined one of the gear positions that is to be established in event of the pressure output failure. On the other hand, in the control apparatus constructed according to the invention, even if the coupling-device controller valve suffers from a drainage failure (in which the drain port remains shut off) in addition to the pressure output failure, the second coupling device is reliably released while the first coupling device is engaged, for enabling the vehicle to run with establishment of the emergency gear position, avoiding the interlocking problem.

The control apparatus according to the present invention is preferably applicable to an automatic transmission of a planetary-gear type having a plurality of planetary gear sets. However, the principle of the present invention is equally applicable to automatic transmissions of any other types including a plurality of hydraulically operated frictional coupling devices selectively engaged and released to effect shifting actions, such as a parallel two-axes type automatic transmission having a plurality of power input paths which are selectively connected to an output rotary member.

Each of the hydraulically operated frictional coupling devices of the automatic transmission may be a multiple-disc or single-disc type clutch or brake, or a belt type brake, which is engaged by a hydraulic actuator and commonly used for an automatic transmission. An oil pump provided to deliver the pressurized working fluid for engaging the frictional coupling device may be driven by a vehicle drive source such as an engine, or an electric motor exclusively provided to drive the oil pump.

Each of the coupling-device controller valves is preferably provided by an electro-magnetically operated valve in the form of a liner solenoid valve outputting an engaging hydraulic pressure regulated by the spool which is positioned in a position of equilibrium between an electromagnetic force, and a sum of a biasing force and a feedback pressure, wherein the electromagnetic force is produced by a solenoid provided on one of opposite sides of the spool, the biasing force is produced by a spring provided on the other side of the spool, and the feedback pressure is produced in a feedback chamber which is provided on the other side of the spool and which receives the output hydraulic pressure. However, each of the coupling-device controller valves may be provided by an ON-OFF solenoid valve the duty ratio or cycle of which is controlled to control the engaging hydraulic pressure.

Where each of the coupling-device controller valves is provided by an electro-magnetically operated valve of normally-closed type, as in the fourth aspect of the invention, the controller valve is brought into the pressure-output failure state (in which the output port and the drain port are held in communication with each other while the input port is shut off, disabling the valve from outputting the engaging hydraulic pressure), in the event of the power supply failure which is caused by, for example, electrical connector disconnection, wire breakage or power-off of an electronic control unit, and which suspends supply of the electric power to the controller valve. The controller valve could be brought into the pressure-output failure state, even where it is provided by a normally-closed type valve, because there is a possibility that the valve may become uncontrollable, for example, due to failure of the electronic control unit, casually when being fully energized.

A hydraulic control unit including the hydraulically operated frictional coupling devices and the corresponding coupling-device controller valves may be preferably arranged to apply the output hydraulic pressure of the coupling-device controller valve directly to a hydraulic actuator (hydraulic cylinder) for engaging the corresponding frictional coupling device, for improving the hydraulic shifting response of the automatic transmission. However, the hydraulic control unit may be modified to further include a second coupling-device controller valve, in addition to each of the coupling-device controller valves as a first coupling-device controller valve, such that the second coupling-device controller valve is provided between each of the first coupling-device controller valves and the corresponding hydraulic actuator. In this modified arrangement, the second controller valve is controlled by the output hydraulic pressure of the first controller valve, and the working fluid is supplied to the hydraulic actuator from the thus controlled second controller valve. The principle of the invention is applicable also to this modified arrangement. That is, even in the event of the pressure output failure of the first controller valve the working fluid can be supplied to the hydraulic actuator of the first coupling device through the second controller valve which is placed in its open position by the hydraulic pressure output from the drain port of the first controller valve, whereby the first coupling device can be engaged.

The coupling-device controller valves are usually provided for the respective hydraulically operated frictional coupling devices. However, where the frictional coupling devices include two or more frictional coupling devices which are simultaneously engaged or released, namely, which are not engaged or released individually of each other, a single common coupling-device controller valve may be provided for these frictional coupling devices.

The fail-safe valve is preferably provided by a single valve with a spool which is provided by, for example, a single member as in the tenth aspect of the invention. However, the fail-safe valve may be provided by a plurality of valves one of which serves to change a combination of communicated ones of the first output, input and drain ports which are held in communication with each other, and the other of which serves to change a combination of communicated ones of the second output, input and drain ports which are held in communication with each other.

The control apparatus preferably includes the fail-safe-valve switcher operable, upon detection of the power supply failure, to place the fail-safe valve in the emergency communication state establishing the emergency gear position, as in the third aspect of the invention. The fail-safe-valve switcher may be arranged to hold the fail-safe valve in the normal communication state, as long as the power supply failure is not detected.

The fail-safe-valve switcher may be provided by an electro-magnetically operated valve which is arranged, when being energized (ON), to place the fail-safe valve in the normal communication state (non-emergency communication state), by allowing or inhibiting the application of the hydraulic pressure to the spool of the fail-safe valve, and when being de-energized (OFF), is place the fail-safe valve in the emergency communication state, by inhibiting or allowing the application of the hydraulic pressure to the spool of the fail-safe valve. The fail-safe valve may include a biaser (e.g., spring) biasing the spool in a direction opposite to a direction in which the hydraulic pressure is applicable to the spool.

A failure of an electric system, such as electric connector disconnection, could be a would be the most probable cause of simultaneous pressure-output failure states of all the coupling-device controller valves. In this respect, the fail-safe-valve switcher is preferably arranged to hold the fail-safe valve in the normal communication state while the electric power is supplied to the fail-safe-valve switcher, and to place the fail-safe valve in the emergency communication state when the supply of the electric power to the fail-safe-valve switcher is stopped. A solenoid is preferably provided in the fail-safe-valve switcher, for thus holding the normal communication state of the fail-safe valve while the electric power is supplied to the fail-safe-valve switcher. However, the solenoid may be replaced with other electrically-operated driving force generator for the same purpose.

The fail-safe valve may be provided by an ON-OFF solenoid valve which is arranged to be held in the normal communication state while its solenoid is being energized (ON), and to be switched to the emergency communication state by a biaser such as spring when its solenoid is de-energized (OFF).

The emergency gear position or positions, which is to be established, for example, in presence of the power supply failure, may be one forward-drive gear position, or alternatively may be two gear positions one of which is a forward-drive gear position and the other of which is a rear-drive gear position. In the latter case, it is possible to construct an arrangement with a manual valve which is mechanically operable by a manually operable member such as a shift lever so as to be placed selectively in its forward drive position and rear drive position. In this arrangement, a forward drive hydraulic pressure is output when the manual valve is placed in the forward drive position, for establishing the forward-drive gear position. A rear drive hydraulic pressure is output when the manual valve is placed in the rear drive position, for establishing the rear-drive gear position. Further, the emergency gear position may be a plurality of forward-drive gear positions having different speed ratios, which are selectively established according to the operation of the manual valve achieved by the manually operating member.

Where a plurality of gear positions as the emergency gear positions are selectively establishable, a plurality of fail-safe valves may be provided for establishing the respective gear positions. Alternatively, it is possible to employ a single fail-safe valve having a plurality of first input ports (emergency input ports) each of which is arranged to receive the hydraulic pressure through a corresponding one of different communication channels that is selected by operation of the manual valve, and a plurality of first output ports (emergency output ports) which are connected to the respective coupling-device controller valves serving to establish the respective gear positions as the emergency gear positions.

BRIEF DESCRIPTION OF THE DRAWINGS

The above and other objects, features, advantages and technical and industrial significance of this invention will be better understood by reading the following detailed description of presently preferred embodiment of the invention, when considered in connection with the accompanying drawings, in which.

DETAILED DESCRIPTION OF THE PREFERRED EMBODIMENT

Figure 1A:
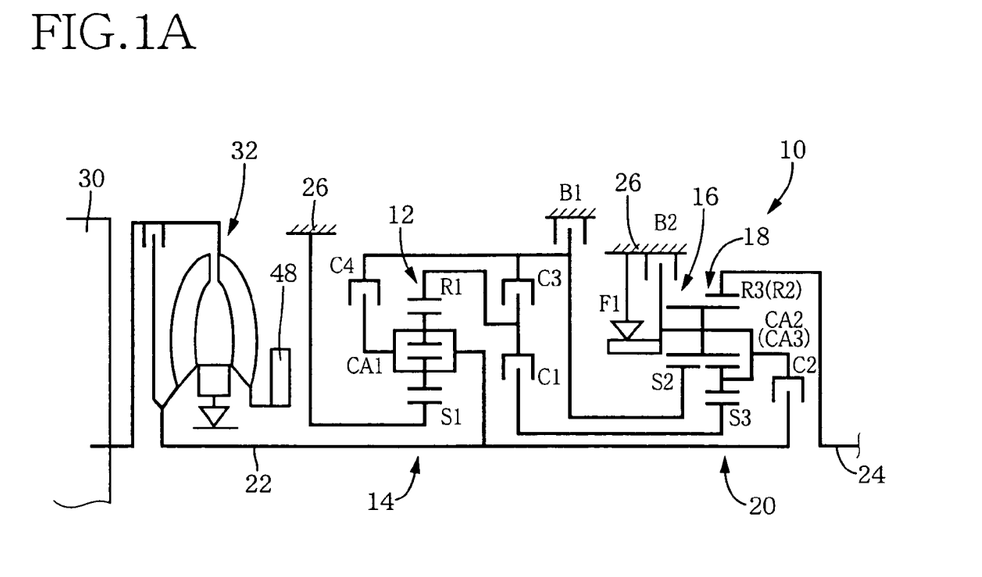
FIG. 1A is a schematic view illustrating a vehicle automatic transmission controlled by a hydraulic control apparatus constructed according to an embodiment of the present invention.

Referring first to the schematic view of FIG. 1A, there is illustrated a basic arrangement of a vehicular automatic transmission 10, which is controlled by a hydraulic control apparatus according to the present invention and which is suitably used on a front-engine rear-drive vehicle (FR vehicle) such that the axial direction of the automatic transmission 10 is parallel to the longitudinal or running direction of the vehicle. As shown in FIG. 1A, the automatic transmission 10 includes a first transmission portion 14 constituted principally by a first planetary gear set 12 of a double-pinion type, and a second transmission portion 20 constituted principally by a second planetary gear set 16 of a single-pinion type and a third planetary gear set 18 of a double-pinion type. The first transmission portion 14 and the second transmission portion 20 are disposed coaxially with each other and are connected to an input shaft 22, and the second transmission portion 20 is connected to an output shaft 24, so that the speed of a rotary motion of the input shaft 22 is changed by the first and second transmission portions 14, 20, into the speed of a rotary motion of the output shaft 24. The input shaft 22, which is an input member of the automatic transmission 10, is a turbine shaft of a torque converter 32 rotated by a drive power source of the vehicle in the form of an engine 30, while the output shaft 24 is an output member of the automatic transmission 10, which is operatively connected to right and left drive wheels of the vehicle through a propeller shaft and a differential gear device (which are not shown). Since the automatic transmission 10 is constructed symmetrically with respect to its axis, the lower half of the automatic transmission 10 located below the axis is omitted in the schematic view of FIG. 1A.

Figure 2:
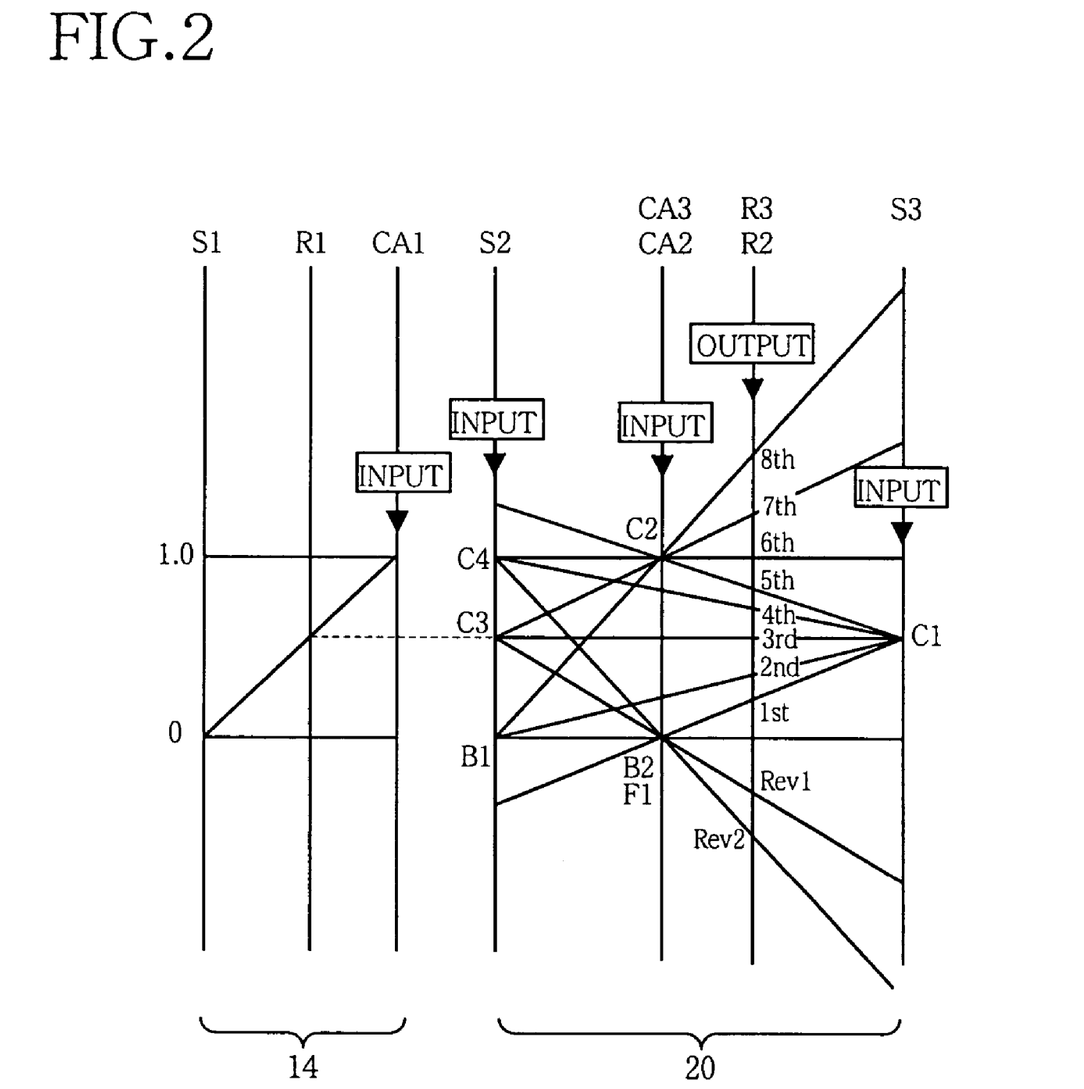
FIG. 2 is a collinear chart indicating, by straight lines, relative rotational speeds of a plurality of rotary elements of the vehicle automatic transmission of FIG. 1A placed in each gear position.

The collinear chart of FIG. 2 indicates, by straight lines, the rotating speed of each element of the first and second transmission portions 14, 20 in each of the gear positions of the automatic transmission 10. The collinear chart has a lower horizontal straight line indicating the speed "0", and an upper horizontal straight line indicating the speed "1.0", namely, the rotating speed of the input shaft 22. The collinear chart further has three vertical straight lines corresponding to the first transmission portion 14, and four vertical straight lines corresponding to the second transmission portion 20. The three vertical straight lines corresponding to the first transmission portion 14 respectively represent sun gear S1, ring gear R1 and carrier CA1, in the order from the left side toward the right side. The four vertical straight lines corresponding to the second transmission portion 20 respectively represent sun gear S2, carriers CA2, CA3, ring gears R2, R3 and sun gear S3, in the order from the left side toward the right side. The automatic transmission 10 includes a plurality of hydraulically operated frictional coupling devices in the form of clutches C1-C4 and brakes B1, B2, which are selectively engaged and released for selectively establishing a plurality of gear positions in the form of eight forward-drive gear positions ("1st" through "8th") and two rear-drive gear positions ("Rev1" and "Rev2).

Figure 1B:
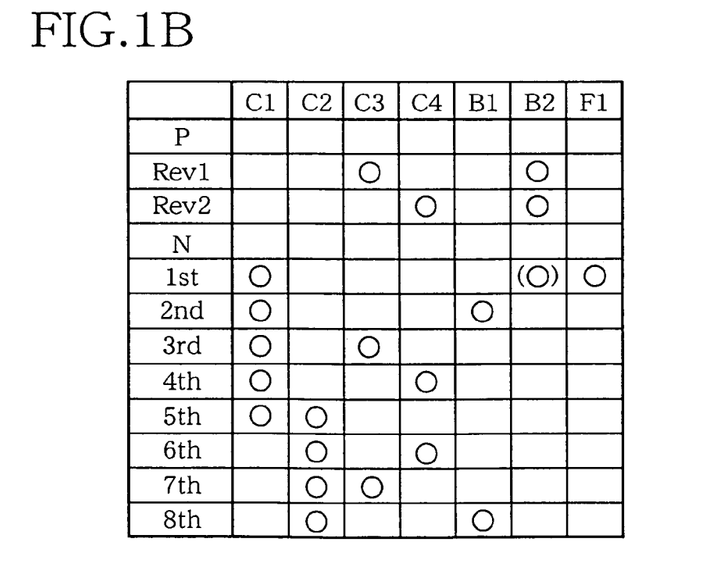
FIG. 1B is a table indicating a relationship between gear positions of the automatic transmission of FIG. 1A and combinations of operating states of hydraulically operated frictional coupling devices to establish the respective gear positions.

The table of FIG. 1B indicates the relationship between the gear positions of the automatic transmission 10 and the respective combinations of the operating states of the clutches C1-C4 and brakes B1 and B2. In the table, "O" represents the engaged state of the clutches and brakes, while "(O)" represents the engaged state of the second brake B2 which is established to apply an engine brake to the vehicle. In the presence of one-way clutch F1 disposed in parallel with the second brake B2 which is engaged to establish the first gear position "1st", the second brake B2 need not be engaged to start or accelerate the vehicle with the automatic transmission 10 placed in the first gear position "1st". The speed ratios of the individual gear positions are determined by the gear ratios $\rho 1$, $\rho 2$ and $\rho 3$ of the first, second and third planetary gear sets 12, 16, 18. It is noted that reference numerals 26 and 48 appearing in FIG. 1A denote a transmission casing and a mechanical oil pump, respectively.

The above-described clutches C1-C4 and brakes B1 and B2 (hereinafter referred to as simply clutches C and brakes B where they do not have to be particularly distinguished from each other) are hydraulically operated frictional coupling devices, each of which may be a multiple-disc clutch or brake having a plurality of mutually superposed friction plates which are forced against each other by a hydraulic actuator. These clutches C and brakes B are engaged and released by energizing and de-energizing solenoids of respective linear solenoid valves SL1-SL6 incorporated in a hydraulic control unit 98 shown in the block diagram of FIG. 3, and transient fluid pressures of the clutches C and brakes B during their engaging and releasing actions are controlled by controlling the electric current applied to the solenoids.

Figure 3:
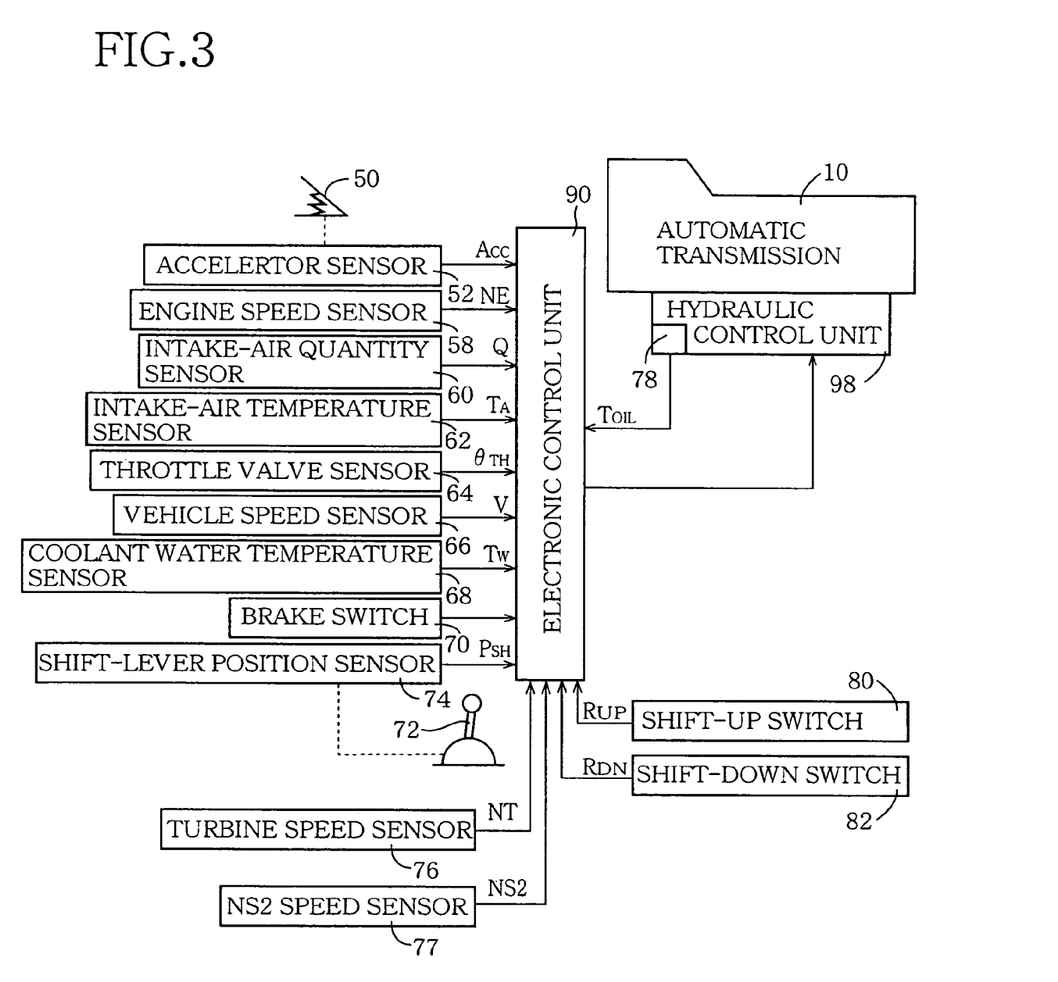
FIG. 3 is a block diagram showing major elements of a control system for controlling the vehicle automatic transmission of FIG. 1A.

Referring to the block diagram of FIG. 3 illustrating a control system provided to control the automatic transmission 10 and other devices of the vehicle, the control system includes: an accelerator sensor 52 operable to detect a vehicle-operator's required output of the engine 30 in the form of an operating amount $A_{CC}$ of an accelerator pedal 50 functioning as a vehicle accelerating member; an engine speed sensor 58 operable to detect a speed $N_E$ of the engine 30; an intake-air quantity sensor 60 operable to detect an intake air quantity Q of the engine 30; an intake-air temperature sensor 62 operable to detect a temperature $T_A$ of the intake air; a throttle valve sensor 64 equipped with an engine idling switch, which is operable to detect an opening angle $\theta_{TH}$ of an electronic throttle valve, and a fully closed state of the electronic throttle valve (idling state of the engine 30); a vehicle speed sensor 66 operable to detect a running speed V of the vehicle (rotating speed $N_{OUT}$ of the output shaft 24); a coolant-water temperature sensor 68 operable to detect a temperature $T_W$ of cooling water of the engine 30; a brake switch 70 operable to detect an operation of a service brake system of the vehicle; a shift-lever position sensor 74 operable to detect a presently selected position $P_{SH}$ of a manually operable member in the form of a shift lever 72; a turbine speed sensor 76 operable to detect a rotating speed NT of the turbine of the torque converter 32 (rotating speed $N_{IN}$ of the input shaft 22); a NS2 speed sensor 77 operable to detect a rotating speed NS2 of the sun gear S2 of the second planetary gear set 16; an oil temperature sensor 78 operable to detect a temperature $T_{OIL}$ of a working fluid used in the hydraulic control unit 98; a shift-up switch 80 operable to generate a shift-up command $R_{UP}$ for shifting up the automatic transmission 10; and a shift-down switch 82 operable to generate a shift-down command $R_{DN}$ for shifting down the automatic transmission 10. The electronic control unit 90 receives output signals of those sensors and switches indicative of the accelerator operating amount $A_{CC}$, engine speed $N_E$, intake-air quantity Q, intake-air temperature $T_A$, throttle opening angle $\theta_{TH}$, vehicle speed V, engine cooling water temperature $T_W$, operation of the service brake system, shift lever position $P_{SH}$, turbine speed NT, sun gear speed NS2, fluid temperature $T_{OIL}$, shift-up command $R_{UP}$ and shift-down command $R_{DN}$.

Figure 4:
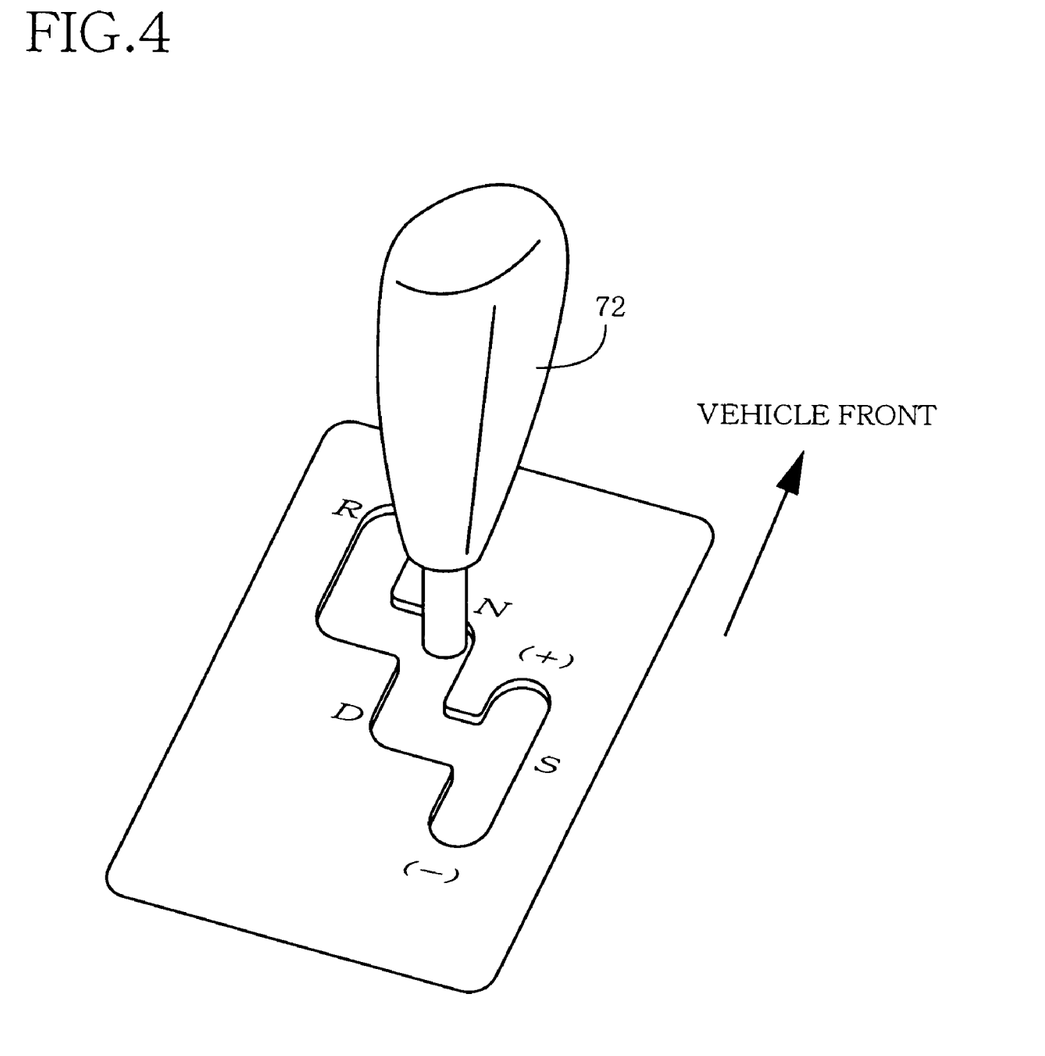
FIG. 4 is a perspective view illustrating one example of a shift lever shown in FIG. 3.
Figure 6:
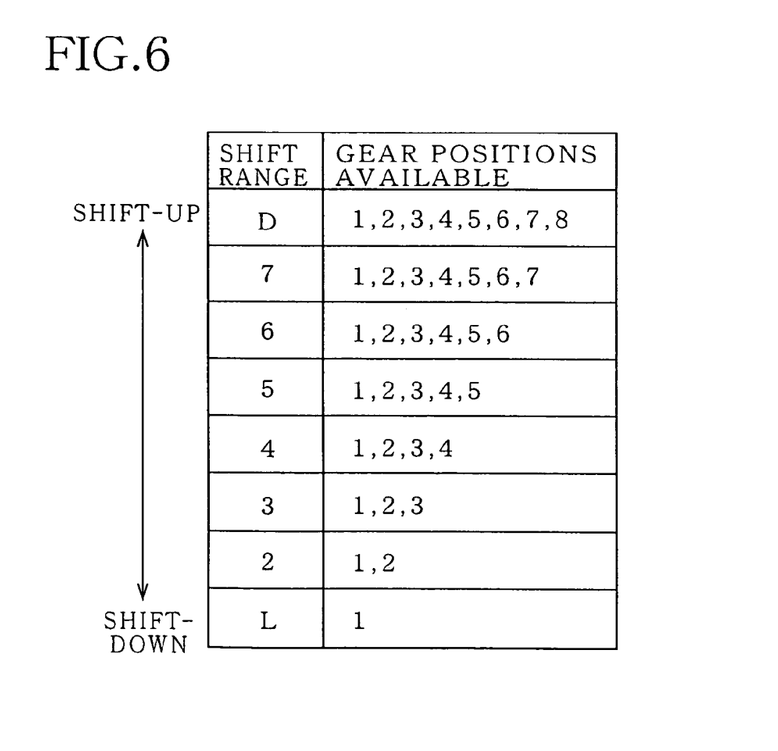
FIG. 6 is a view indicating shift ranges of the vehicle automatic transmission which are selectively established by operating the shift lever.

The shift lever 72 is disposed near a vehicle-operator's seat of the vehicle, and has four positions: a reverse position R; neutral position N; a drive position D (automatic shifting position); and a sequential position S (manual shifting position), as shown in FIG. 4. The reverse position R is selected to drive the vehicle in the backward or reverse direction. In the neutral position N, vehicle drive power is not transmitted from the engine 30 to the drive wheels. The drive position D is selected to drive the vehicle in the forward direction with automatic shifting actions of the automatic transmission 10. The sequential position S is selected to drive the vehicle in the forward direction such that the automatic transmission 10 may be shifted up or down by operating the shift lever 72 from the sequential position S to a shift-up position "+" or a shift-down position "−" indicated in FIG. 4. As described below in detail by reference to FIG. 6, one of eight shift ranges L, 2-7 and D can be selected by operating the shift lever 72 to the shift-up position "+" or shift-down position "−", to select the number of the gear positions of the automatic transmission 10 available for automatic shifting. As indicated above, the shift-lever position sensor 74 detects the presently selected one of the positions R, N, D and S of the shift lever 72.

Figure 5:
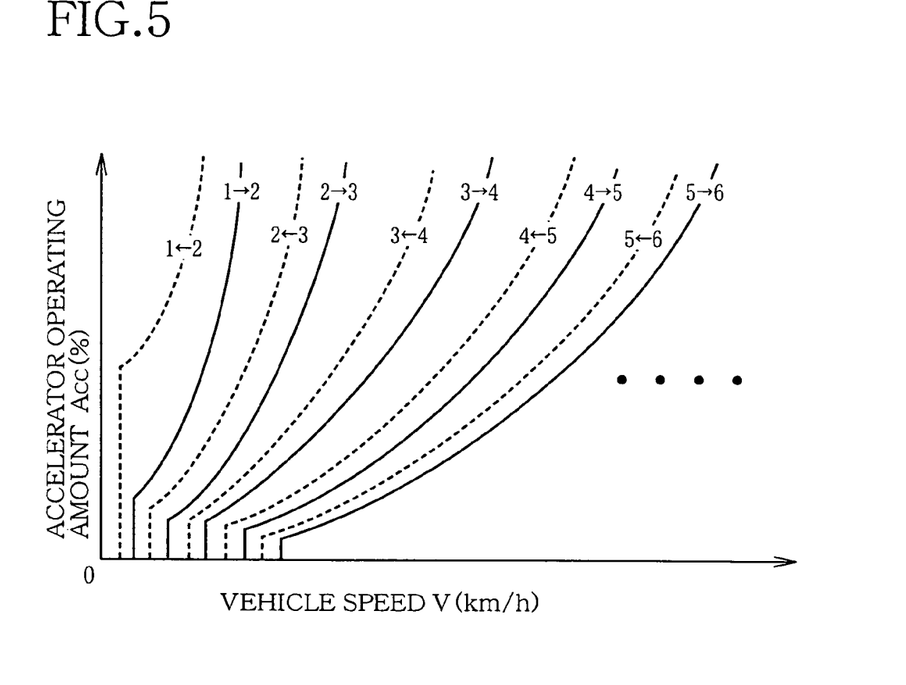
FIG. 5 is a view indicating an example of shift-up and shift-down boundary lines represented by a shifting boundary line map used for automatic shifting of the vehicle automatic transmission of FIG. 1A according to a running state of the vehicle.

When the shift lever 72 is placed in the drive position (automatic shifting position) D or sequential position (manual shifting position) S, the vehicle is driven in the forward direction with an automatic shifting action of the automatic transmission 10 to an appropriate one of the eight forward drive gear positions "1st" through "8th". When an operation of the shift lever 72 to the drive position D is detected by the shift-lever position sensor 74, the electronic control unit 90 commands the hydraulic control unit 98 to place the automatic transmission 10 in an automatic shifting mode in which the automatic transmission 10 is automatically shiftable to any one of the eight forward-drive gear positions "1st" through "8th", with an appropriate combination of the engaged and released states of the clutches C and brakes B which is established by energization and de-energization of the linear solenoid valves SL1-SL6, on the basis of a running condition of the vehicle and according to a predetermined shifting rule in the form of a shifting boundary line map stored in a ROM of the electronic control unit 90. An example of the shifting boundary line map is illustrated in FIG. 5, which represents shift-up boundary lines indicated by solid lines, and shift-down boundary lines indicated by broken lines. Each boundary line represents a relationship between the vehicle speed V and the accelerator operating amount $A_{CC}$, which is determined such that the automatic transmission 10 is shifted down to increase the speed ratio, as the detected vehicle speed V is lowered at a given value of the accelerator operating amount $A_{CC}$, or as the detected accelerator operating amount $A_{CC}$ is increased at a given value of the vehicle speed V, as is apparent from FIG. 5. However, the parameters used for automatic shifting actions of the automatic transmission 10 are not limited to the vehicle speed V and the accelerator operating amount $A_{CC}$. For instance, the accelerator operating amount $A_{CC}$ may be replaced by the intake-air quantity Q, and a surface gradient of a roadway on which the vehicle is running may be used as one of the control parameters.

When an operation of the shift lever 72 to the sequential position (manual shifting position) S is detected by the shift-lever position sensor 74, the electronic control unit 90 commands the hydraulic control unit 98 to place the automatic transmission 10 in a manual shifting mode in which the automatic transmission 10 is automatically shiftable to any one of the forward-drive gear positions within one of the eight shift ranges L, 2-7 and D which is selected by operating the shift lever 72 to the shift-up or shift-down position "+" or "−". The shift-up and shift-down positions "+" and "−" are spaced apart from each other in the vehicle running direction, and the sequential position S is located between the shift-up and shift-down positions "+" and "−" in the vehicle running direction. The manual shifting mode is electrically established upon operation of the shift lever 72 to the sequential position S, to select the number of the gear positions available for automatic shifting of the automatic transmission 10. Described in greater detail, when an operation of the shift lever 72 to the shift-up position "+" or shift-down position "−" is detected by the shift-up switch 80, the shift-up command $R_{UP}$ is generated to change the presently established shift range to the new shift range in which the number of the gear positions available is larger by one than that of the presently established shift range. Accordingly, the shift-up command $R_{UP}$ changes the highest gear position (having the lowest speed ratio) available, in the direction of lowering the speed ratio, for example, from the fourth gear position "4th" to the fifth gear position "5th" when the shift lever 72 is operated from the sequential position S to the shift-up position "+". When an operation of the shift lever 72 to the shift-down position "−" is detected by the shift-down switch 82, the shift-down command $R_{DN}$ is generated to change the presently established shift range to the new shift range in which the number of the gear positions available is smaller by one than that of the presently established shift range. Accordingly, the shift-down command $R_{DN}$ changes the highest gear position available, in the direction of increasing the speed ratio, for example, from the fifth gear position "5th" to the fourth gear position "4th" when the shift lever 72 is operated from the sequential position S to the shift-down position "−". Thus, each time the shift lever 72 is operated to the shift-up position "+" or the shift-down position "−", the presently established one of the eighth shift ranges L, 2-7 and D is changed to the next adjacent shift range so that the number of the gear positions available for automatic shifting of the automatic transmission 10 is incremented or decremented, with a result of a change of the highest gear position available for the automatic shifting. Within the newly established shift range, the automatic transmission 10 is automatically shifted up or down depending upon the running condition of the vehicle and according to the shifting boundary line map of FIG. 5. When the shift lever 72 is repeatedly operated to the shift-down position "−" during running of the vehicle on a downhill road, the shift range is sequentially changed from the shift range 4 toward the shift range L, so that the automatic transmission 10 may be sequentially shifted down from the fourth gear position "4th" toward the first gear position "1st", with a result of an increase of the engine braking force in steps. In the manual shifting mode, the first gear position "1st" is established by engaging the second brake B2 as well as the first clutch C1, so that an engine brake is applied to the vehicle in this first gear position.

The shift lever 72 is automatically returned from the shift-up position "+" or the shift-down position "−" back to the sequential position S, under a biasing action of biasing means such as a spring. While the shift range is changed according to the number of operations of the shift lever 72 to the shift-up or shift-down position "+", "−" in the illustrated embodiment, the shift range may be changed according to a time duration for which the shift lever 72 is held at the shift-up or shift-down position.

Figure 7:
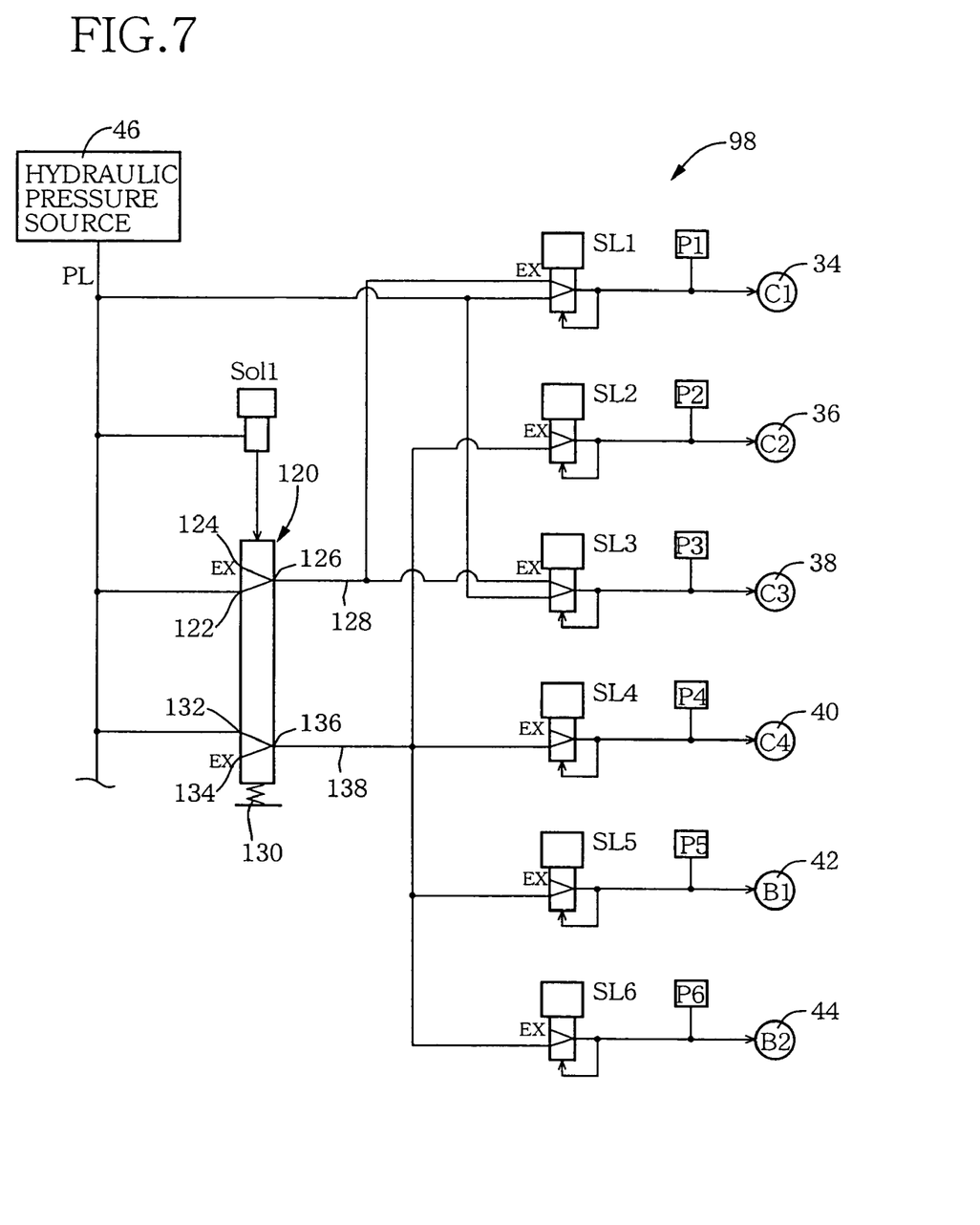
FIG. 7 is a hydraulic circuit diagram illustrating major elements of a hydraulic control unit shown in FIG. 3.

The hydraulic control diagram of FIG. 7 shows major elements of the hydraulic control unit 98, which includes hydraulic actuators 34, 36, 38, 40, 42 and 44 in the form of hydraulic cylinders for the respective clutches C1-C4 and brakes B1 and B2. The hydraulic cylinders 34-44 are supplied with a pressurized working fluid having a line pressure PL, which is delivered from a hydraulic pressure source 46. The pressure of the fluid having the line pressure PL is regulated by each of the linear solenoid valves SL1-SL6, so that the regulated fluid pressure is applied to the corresponding hydraulic actuator 34-44. The clutches C1-C4 and brakes B1, B2 are engaged and released by energizing and de-energizing solenoids of the respective linear solenoid valves SL1-SL6, namely, by regulating the fluid pressure applied to the respective hydraulic actuator 34-44, and transient fluid pressures of the clutches C and brakes B during their engaging and releasing actions are controlled by controlling the electric current applied to the solenoids. The hydraulic pressure source 46 includes the above-described oil pump 48 driven by the engine 30, a regulator valve operable to adjust the line pressure PL according to a load acting on the engine 30, and a manual valve operable to mechanically establish a selected one of different hydraulic communication channels according to a presently selected position $P_{SH}$ of the shift lever 72.

Figure 8:
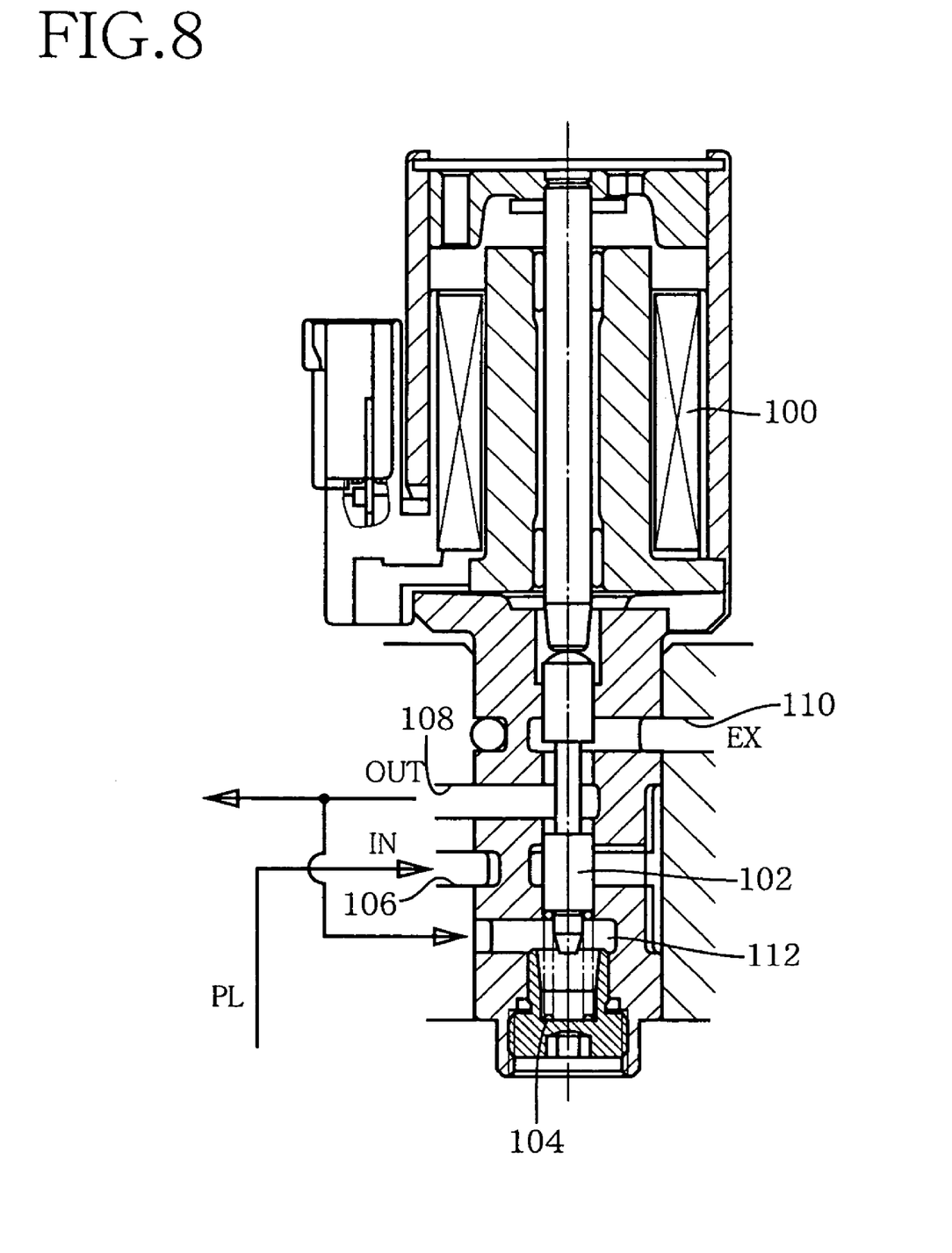
FIG. 8 is an elevational view in axial cross section showing one of linear solenoid valves shown in FIG. 7.

The linear solenoid valves SL1-SL6 serving as coupling-device controller valves are identical in basic construction with each other, and are normally-closed valves. As shown in FIG. 8, each linear solenoid valve SL includes a solenoid 100; a spool 102; a spring 104; an input port 106 which receives the line pressure PL; an output port 108 from which a regulated output fluid pressure is applied to the corresponding actuator 34-44; a drain port 110; and a feedback chamber 112 which receives the output fluid pressure as a feedback hydraulic pressure Pf. Each of the linear solenoid valves SL1-SL6 outputs the hydraulic pressure (equal to the feedback hydraulic pressure Pf), to a corresponding one of the hydraulic actuators 34-44, while regulating or controlling the hydraulic pressure by continuously changing a combination of mutually communicated ones of the three ports 106, 108, 110 (which are held in communication with each other) according to an electromagnetic force generated by the solenoid 100, such that the feedback pressure Pf, a pressure-receiving surface area Af at which the spool 102 receives the feedback pressure Pf, a load (biasing force) Fs of the spring 104, and the electromagnetic force F of the solenoid 100 cooperate to satisfy the following expression (1):

$$F = Pf \times Af + Fs \quad (1)$$

It is noted that the solenoids 100 of the linear solenoid valves SL1-SL6 are controlled independently of each other by the electronic control unit 90 shown in FIG. 3, to regulate the fluid pressures of the hydraulic actuators 34-44 independently of each other.

If the spool 102 remains unmovable in a direction away from the spring 104, for example, due to so-called "valve stuck" which is operational abnormality caused by foreign matters caught in the valve structure, the input and output ports 106, 108 are held in communication with each other, irrespective of whether the solenoid 100 is energized or de-energized, disabling drainage of the working fluid from the corresponding coupling device, whereby the corresponding coupling device is held engaged. Such a drainage failure of the linear solenoid valve SL1-SL6 could cause "interlocking" of some combinations of the simultaneous engaging actions of the frictional coupling devices C, B which are not normally available due to speed differences of the rotary elements associated with the frictional coupling devices in question. For example, when the fourth gear position "4th" is to be established by engaging the clutches C1, C4 (see FIG. 1B), if any one of the other frictional coupling devices C2, C3, B1, B2 as well as the clutches C1, C4 is engaged, the transmission 10 suffers from the interlocking which could cause an undesirable variation of an output drive force of the transmission 10 and an excessively large load acting on the friction members of the simultaneously engaged frictional coupling devices, resulting in deterioration of the durability of the friction members.

For avoiding the interlocking phenomenon, in the present embodiment, hydraulic pressure sensors P1-P6 are provided to detect hydraulic pressures PC1, PC2, PC3, PC4, PB1, PB2 in the respective clutches C1-C4 and brakes B1, B2, for determining whether each of the linear solenoid valves SL1-SL6 suffers from the drainage failure (due to the valve stuck, for example). If any one of the linear solenoid valves SL1-SL6 is determined to suffer from the drainage failure, the transmission 10 is placed in one of limited gear positions which permit the vehicle to run without suffering from the interlocking problem. That is, in the event of the drainage failure, the transmission 10 is placed in one of the limited gear positions which can be established without having to release the coupling device in question that is held in its engaged state due to the drainage failure of the corresponding liner solenoid valve. For example, where the third clutch C3 is fixedly held in its engaged state due to the drainage failure of the linear solenoid valve SL3, the vehicle is driven with the transmission 10 being placed in one of the third gear position "3rd", seventh gear position "7th" and first rear-drive gear positions "Rev1" which can be established without having to release the third clutch C3. In this instance, the transmission 10 can be placed in one of the three gear positions which is selectable by the manual valve operable by the shift lever 72, namely, the vehicle can be driven in either one of the forward and reverse directions which is selectable by operation of the manual valve.

The spool of each of the linear solenoid valves SL1-SL6 is positioned in a position of equilibrium of the forces which is determined according to the above-described expression (1), for controlling the output hydraulic pressure. When the solenoid 100 is de-energized (OFF) as a result of stop of the supply of the electric power to the linear solenoid valve, the linear solenoid valve is placed in its closed state, namely, the spool 102 is held in one of its stroke ends closer to the solenoid 100, owing to the load Fs of the spring 104, so that the input port 106 is substantially shut off while the output port 108 is held in communication with the drain port 110, whereby the hydraulic pressure output from the linear solenoid valve is zeroed for releasing the corresponding frictional coupling device. If all the linear solenoid valves SL1-SL6 become uncontrollable as a result of de-energization (OFF) of their solenoids 100 due to the power supply failure caused by, for example, electrical connector disconnection, wire breakage or power-off of the electronic control unit 90, all the clutches C and brakes B are released whereby the transmission 10 is placed the neutral position N disabling the vehicle from running.

In the present embodiment, where the linear solenoid valves SL1-SL6 suffer from the power supply failure, namely, where they are brought into a pressure-output failure state in which the valves become incapable of applying hydraulic pressure to the frictional coupling devices, the third gear position "3rd" as an emergency gear position is mechanically established, enabling the vehicle to run. Described specifically, the line pressure PL (e.g., forward drive hydraulic pressure output from the manual valve) is delivered to the drain ports 110 of the linear solenoid valves SL1, SL3 as first controller valves connected to the first and third clutches C1, C3 as first coupling devices which are to be engaged for establishing the third gear position "3rd", via a sequence valve 120 as a fail-safe valve, and the thus delivered line pressure PL is supplied to the hydraulic actuators 34, 38 of the first and third clutches C1, C3 via the output ports 108 of the linear solenoid valves SL1, SL3, as shown in FIG. 7, whereby the third gear position "3rd" is established as a result of engagements of the first and third clutches C1, C3. Each of the first and third clutches C1, C3 serves as the first coupling device that is to be engaged for establishing the third gear position "3rd" as the emergency gear position. Each of the other frictional coupling devices (i.e., clutches C2, C4, brakes B1, B2) serves as a second coupling device that is to be released for establishing the third gear position "3rd" as the emergency gear position.

The sequence valve 120 serving as the fail-safe valve has a first input port 122 to which the line pressure PL is supplied, a first drain port 124 from which the working fluid is drained, and a first output port 126 which is connected to the drain ports 110 of the linear solenoid valves SL1, SL3 serving as the first controller valves, via first communication passages 128. When a spool (not shown) of the sequence valve 120 is moved to one of its stroke ends by a biasing force of a spring 130, the valve 120 is placed in its normal communication state in which the first output port 126 and the first drain port 124 are held in communication with each other while the first input port 122 is shut off. In this normal communication state, the drain ports 110 of the linear solenoid valves SL1, SL3 are held in communication with the first drain port 124 of the sequence valve 120, for thereby allowing drainage of the working fluid through the first drain port 124, and accordingly enabling the linear solenoid valves SL1, SL3 to engage and release the clutches C1, C3 and to control transient fluid pressures of the clutches C1, C3 during their engaging and releasing actions. Since the working fluid is drained through the first drain port 124 in the normal communication state, the first drain port 124 may also be referred also to as a non-emergency drain port.

The control apparatus includes a fail-safe-valve switcher in the form of an ON-OFF solenoid valve Sol1 of normally open-type which is connected to the sequence valve 120. The ON-OFF solenoid valve Sol1 serves as a spool-position controller valve selectively allowing and stopping application of the line pressure PL to the spool of the sequence valve 120 in a direction causing the sequence valve 120 to be placed in its emergency communication state. When a solenoid of the ON-OFF solenoid valve Sol1 is de-energized (OFF), the valve Sol1 is placed in its open state allowing the application of the line pressure PL to the spool of the sequence valve 120. When the solenoid of the ON-OFF solenoid valve Sol1 is energized (ON), the valve Sol1 is placed in its closed state stopping the application of the line pressure PL to the spool of the sequence valve 120. When the line pressure PL is applied to the spool of the sequence valve 120 with the solenoid being de-energized (OFF), the spool is moved to the other stroke end against the biasing force of the spring 130, so that the sequence valve 120 is placed in its emergency communication state in which the first output port 126 and the first input port 122 are held in communication with each other while the first drain port 124 is shut off. In this emergency communication state, the first output port 126 and the first input port 122 held in communication with each other serve as an emergency output port and an emergency input port, respectively, for allowing delivery of the line pressure PL through the sequence valve 120 to the drain ports 110 of the linear solenoid valves SL1, SL3. The thus delivered line pressure PL is supplied to the hydraulic actuators 34, 38, whereby the third gear position "3rd" is established as a result of engagements of the first and third clutches C1, C3.

In absence of the power supply failure, the solenoid of the ON-OFF solenoid valve Sol1 is energized (ON) by the electronic control unit 90, and stops outputting the line pressure PL to the spool of the sequence valve 120, for holding the sequence valve 120 in its normal communication state. In presence of the power supply failure which is caused by, for example, electrical connector disconnection, wire breakage or power-off of the electronic control unit 90, the solenoid of the ON-OFF solenoid valve Sol1 is de-energized (OFF), and outputs the line pressure PL to the spool of the sequence valve 120, for placing the sequence valve 120 in its emergency communication state, against the biasing force of the spring 130. That is, in the event of the power supply failure which suspends supply of the electric power to the linear solenoid valves SL1-SL6, namely, in the event of the pressure-output failure state, the ON-OFF solenoid valve Sol1, whose solenoid is de-energized (OFF), places the sequence valve 120 in its emergency communication state mechanically establishing the third gear position "3rd" as the emergency gear position. In this sense, the ON-OFF solenoid valve Sol1 may be considered to serve as a power supply failure detector which detects the power supply failure when its solenoid is not energized, and which outputs the line pressure PL as a signal representative of the power supply failure, upon detection of the power supply failure.

The sequence valve 120 has, in addition to a function of forcing the clutches C1, C3 as the first coupling devices to be engaged for establishing the third gear position "3rd" as the emergency gear position, a function of forcing the clutches C2, C4 and brakes B1, B2 as the second coupling devices to be released for assuring the establishment of the third gear position "3rd". That is, the sequence valve 120 has, in addition to the above-described first input, drain and output ports 122, 124, 126, a second input port 132 to which the line pressure PL is supplied, a second drain port 134 from which the working fluid is drained, and a second output port 136 which is connected to the input ports 106 of the linear solenoid valves SL2, SL4, SL5, SL6 serving as second controller valves, via second communication passages 138. While the output of the line pressure PL to the spool of the sequence valve 120 is being stopped with energization of the solenoid of the ON-OFF solenoid valve Sol1, the spool of the sequence valve 120 is held in the stroke end by the biasing of the spring 130, whereby the valve 120 is placed in its normal communication state in which the second output port 136 and the second input port 132 are held in communication with each other while the second drain port 134 is shut off. In this normal communication state, the second output and input ports 136, 132 held in communication with each other serve as non-emergency output and input ports, respectively, through which the line pressure PL is supplied to the input ports 106 of the linear solenoid valves SL2, SL4, SL5, SL6, thereby enabling the linear solenoid valves SL2, SL4, SL5, SL6 to engage and release the clutches C2, C4 and brakes B1, B2 and to control transient fluid pressures of the these second coupling devices during their engaging and releasing actions.

When the sequence valve 120 is placed in its emergency communication state with its solenoid being de-energized (OFF), the second output port 136 and the second drain port 134 are held in communication with each other while the second input port 132 is shut off. In this emergency communication state, the input ports 106 of the linear solenoid valves SL2, SL4, SL5, SL6 are held in communication with the second drain port 134 of the sequence valve 120 which serves as an emergency drain port, whereby the working fluid discharged from the clutches C2, C4 and brakes B1, B2 can be drained through the input ports 106 of the linear solenoid valves SL2, SL4, SL5, SL6 and the second drain port 134 of the sequence valve 120. This arrangement assures the releasing actions of the clutches C2, C4 and brakes B1, B2, even where the spool 102 of any one of the linear solenoid valves SL2, SL4, SL5, SL6 remains unmovable from its open position, for example, due to the "valve stuck". That is, even if the "drainage failure" takes place together with the pressure output failure (or power supply failure), the clutches C2, C4 and brakes B1, B2 can be reliably released for enabling the vehicle to run with the transmission 10 being placed in the third gear position "3rd", avoiding the interlocking problem.

As described above, in the control apparatus constructed according to the present embodiment, the sequence valve 120 as the fail-safe valve is connected through the first communication passages 128 to the drain ports 110 of the linear solenoid valves SL1, SL3 controlling the clutches C1, C3 which are to be engaged for establishing the third gear position "3rd" as the emergency gear position. In the event of the pressure output failure (or power supply failure) disabling all the linear solenoid valves SL1-SL6 from outputting the hydraulic pressure, the solenoid of the ON-OFF solenoid valve Sol1 is de-energized (OFF) whereby the sequence valve 120 is switched from its normal communication state to its emergency communication state, so that the line pressure PL is delivered to the drain ports 110 of the linear solenoid valves SL1, SL3 through the sequence valve 120, and the thus delivered line pressure PL is supplied to the hydraulic actuators 34, 38 through the output ports 108 of the linear solenoid valves SL1, SL3. Thus, the third gear position "3rd" is mechanically established, enabling the vehicle to run even in the event of the pressure output failure or power supply failure.

The sequence valve 120 is connected through the second communication passages 138 to the input ports 106 of the linear solenoid valves SL2, SL4, SL5, SL6 controlling the clutches C2, C4 and brakes B1, B2 which are to be released for establishing the third gear position "3rd" as the emergency gear position. While the sequence valve 120 is held in the normal communication state, the line pressure PL is suppliable to the input ports 106 of the solenoid valves SL2, SL4, SL5, SL6 through the second output port 136 as the non-emergency output port, thereby enabling the linear solenoid valves SL2, SL4, SL5, SL6 to engage and release the clutches C2, C4 and brakes B1, B2 and to control transient fluid pressures of the these second coupling devices during their engaging and releasing actions. When the sequence valve 120 is placed in its emergency communication state in the event of the pressure output failure (power supply failure), the input ports 106 of the solenoid valves SL2, SL4, SL5, SL6 are brought into communication with the second drain port 134 as the emergency drain port. This arrangement allows the working fluid to be drained through the input ports 106 of the linear solenoid valves SL2, SL4, SL5, SL6 and the second drain port 134 of the sequence valve 120, when the spools 102 of the linear solenoid valves SL2, SL4, SL5, SL6 remain unmovable in a direction away from the spring 104, for example, due to the "valve stuck". Thus, the clutches C2, C4 and brakes B1, B2 can be reliably released for enabling the vehicle to run with the third gear position "3rd", avoiding the interlocking problem.

In the control apparatus of the present embodiment, the hydraulic pressures PC1, PC2, PC3, PC4, PB1, PB2 in the respective clutches C1-C4 and brakes B1, B2 are detected by the hydraulic pressure sensors P1-P6, and it is determined whether each of the linear solenoid valves SL1-SL6 suffers from the drainage failure (due to the valve stuck, for example), so that the transmission 10 is placed in one of limited gear positions which permit the vehicle to run without suffering from the interlocking problem, if any one of the linear solenoid valves SL1-SL6 is determined to suffer from the drainage failure. As discussed above, in the conventional fail-safe arrangement, if the above-described pressure output failure is caused by, for example, electrical connector disconnection, in addition to the interlocking, the vehicle can not be avoided from suffering from the interlocking problem, unless at least one of the above-described limited gear positions coincides with the predetermined gear position that is to be established in event of the pressure output failure. On the other hand, in the control apparatus constructed according to the present embodiment, the sequence valve 120 causes the input ports 106 of the linear solenoid valves SL2, SL4, SL5, SL6 to be brought into communication with the second drain port (emergency drain port) 134, for reliably releasing the clutches C2, C4 and brakes B1, B2. Therefore, even if the linear solenoid valves SL2, SL4, SL5, SL6 suffer from the drainage failure in addition to the pressure output failure, it is possible to enable the vehicle to run with establishment of the third gear position "3rd" as the emergency gear position, avoiding the interlocking problem.

Further, in the present control apparatus, since the sequence valve 120 is connected to the drain port 110 or input port 106 of each of the linear solenoid valves SL1-SL6, there is less risk of deteriorating accuracy and speed of response of the hydraulic actuators 34-44 to the linear solenoid valves SL1-SL6, than in an arrangement in which the sequence valve 120 is disposed between the linear solenoid valves SL1-SL6 and the hydraulic actuators 34-44.

While the embodiment of the present invention has been described above for illustrative purpose only, it is to be understood that the present invention may be embodied with various changes and improvements, which may occur to those skilled in the art.

What is claimed is:

1. A control apparatus for controlling a vehicle automatic transmission including a plurality of hydraulically operated frictional coupling devices operable to selectively establish a plurality of gear positions having respective different speed ratios, wherein said plurality of hydraulically operated frictional coupling devices include (i) at least one first coupling device that is to be engaged for establishing an emergency gear position which is a predetermined one of the plurality of gear positions, and (ii) at least one second coupling device that is to be released for establishing said emergency gear position, said control apparatus comprising:

(a) a plurality of coupling-device controller valves operable to control flow of a pressurized working fluid that is to be supplied to the respective hydraulically operated frictional coupling devices; and (b) a fail-safe valve, wherein each of said plurality of coupling-device controller valves has:

(a-1) an input port to which the pressurized working fluid is to be input;

(a-2) an output port from which the working fluid is to be output to a corresponding one of the hydraulically operated frictional coupling devices;

(a-3) a drain port from which the working fluid is to be drained; and (a-4) a spool which is movable to change a combination of communicated ones of said input, output and drain ports which are held in communication with each other, such that said corresponding one of the hydraulically operated frictional coupling devices is selectively engaged and released depending upon said combination of the communicated ports, and wherein said fail-safe valve has:

(b-1) a first output port connected to said drain port of a first controller valve which is one of said controller valves controlling flow of the working fluid supplied to each of said at least one first coupling device;

(b-2) a first input port communicable with said first output port such that the working fluid supplied to said first input port can be supplied to said drain port of said first controller valve through said first output port;

(b-3) a first drain port communicable with said first output port such that the working fluid discharged to said first output port from said each of said at least one first coupling device can be drained through said first drain port;

(b-4) a second output port connected to said input port of a second controller valve which is one of said controller valves controlling flow of the working fluid supplied to each of said at least one second coupling device;

(b-5) a second input port communicable with said second output port such that the pressurized working fluid supplied to said second input port can be supplied to said input port of said second controller valve through said second output port; and (b-6) a second drain port communicable with said second output port such that the working fluid discharged to said second output port from said each of said at least one second coupling device can be drained through said second drain port.

2. The control apparatus according to claim 1, wherein said fail-safe valve is switchable between a normal communication state and an emergency communication state, wherein when said fail-safe valve is placed in said normal communication state, said first output port and said first drain port are held in communication with each other, said first input port is not held in communication with said first output port, said second output port and said second input port are held in communication with each other, and said second drain port is not held in communication with said second output port, and wherein when said fail-safe valve is placed in said emergency communication state, said first output port and said first input port are held in communication with each other, said first drain port is not held in communication with said first output port, said second output port and said second drain port are held in communication with each other, and said second input port is not held in communication with said second output port.

3. The control apparatus according to claim 1, wherein each of said plurality of coupling-device controller valves is provided by an electro-magnetically operated valve, said control apparatus further comprising:

a power supply failure detector detecting a power supply failure disabling sufficient supply of an electric power to said plurality of coupling-device controller valves; and a fail-safe-valve switcher operable when said power supply failure is detected by said power supply failure detector, to place said fail-safe valve in an emergency communication state establishing said emergency gear position.

4. The control apparatus according to claim 3, wherein each of said plurality of controller valves, when being energized, is placed in an open state in which said output port and said input port are held in communication with each other while said drain port is not held in communication with said output port, and wherein each of said plurality of controller valves, when being de-energized, is placed in a closed state in which said output port and said drain port are held in communication with each other while said input port is not held in communication with said output port.

5. The control apparatus according to claim 4, wherein when said fail-safe valve is placed in said emergency communication state, said first output port and said first input port are held in communication with each other, so as to serve as an emergency output port and an emergency input port, for allowing supply of the working fluid to each of said at least one first coupling device through said emergency input and output ports of said fail-safe valve and said drain and output ports of said first controller valve, so that said at least one first coupling device is engaged for establishing said emergency gear position.

6. The control apparatus according to claim 5, wherein when said fail-safe valve is placed in said emergency communication state, said second drain port is held in communication with said second output port, so as to serve as an emergency drain port, for allowing draining of the working fluid discharged from each of said at least one second coupling device through output and input ports of said second controller valve and said second output and emergency drain ports of said fail-safe valve, so that said at least one second coupling device is released for establishing said emergency gear position.

7. The control apparatus according to claim 3, wherein said fail-safe-valve switcher is provided by a spool-position controller valve selectively allowing and inhibiting application of hydraulic pressure to a spool of said fail-safe valve in a direction causing said fail-safe valve to be placed in said emergency communication state, wherein said spool-position controller valve is provided by an electro-magnetically operated valve, wherein said spool-position controller valve, when being energized, is placed in a closed state inhibiting said application of the hydraulic pressure, so that said fail-safe valve is not placed in said emergency communication state, and wherein said spool-position controller valve, when being de-energized, is placed in an open state allowing said application of the hydraulic pressure, so that said fail-safe valve is placed in said emergency communication state.

8. The control apparatus according to claim 7, wherein said spool-position controller valve serves as said power supply failure detector, and detects said power supply failure when said spool-position controller valve is not energized, and wherein said spool-position controller valve serving as said power supply failure detector, upon detection of said power supply failure, outputs said hydraulic pressure, as a signal representative of said power supply failure, which is applied to said spool of said fail-safe valve.

9. The control apparatus according to claim 7, wherein said fail-safe valve includes a biaser biasing said spool of said fail-safe valve in a direction opposite to said direction causing said fail-safe valve to be placed in said emergency communication state.

10. The control apparatus according to claim 1, wherein said fail-safe valve includes a spool which is movable to change a combination of communicated ones of said first output, input and drain ports which are held in communication with each other and also a combination of communicated ones of said second output, input and drain ports which are held in communication with each other, and wherein said spool of said fail-safe valve is provided by a single member.

* * * * *